United States Patent [19]

Webb

[11] 4,028,297
[45] June 7, 1977

[54] NOVEL FLAME RETARDANT POLYCARBONATE COMPOSITIONS

[75] Inventor: Jimmy L. Webb, Ballston Lake, N.Y.

[73] Assignee: General Electric Company, Schenectady, N.Y.

[22] Filed: July 18, 1975

[21] Appl. No.: 597,006

[52] U.S. Cl. .................. 260/37 PC; 260/45.7 S; 260/45.7 ST; 260/DIG. 24
[51] Int. Cl.$^2$ ......................................... C08K 3/30
[58] Field of Search ............... 260/45.7 ST, 37 PC, 260/42.24

[56] References Cited
UNITED STATES PATENTS

| | | | |
|---|---|---|---|
| 3,053,778 | 9/1962 | Toone | 260/2.5 |
| 3,560,431 | 2/1971 | Weedon et al. | 260/45.7 |
| 3,739,060 | 6/1973 | Tomiyama et al. | 423/512 |
| 3,817,907 | 6/1974 | Muller et al. | 260/37 |

*Primary Examiner*—Donald E. Czaja
*Assistant Examiner*—R. A. White
*Attorney, Agent, or Firm*—F. Wesley Turner; Joseph T. Cohen; Jerome C. Squillaro

[57] ABSTRACT

This invention is concerned with a new class of flame retardant polycarbonate compositions. More particularly, the invention is concerned with an admixture of an aromatic polycarbonate and a flame retardant additive selected from an alkali or alkaline earth metal salt of an inorganic sulfur compound. The flame retardant polycarbonates can be molded or formed into fire-retardant articles, such as films, sheets, fibers, laminates, or reinforced plastics by conventional techniques.

10 Claims, No Drawings

NOVEL FLAME RETARDANT POLYCARBONATE COMPOSITIONS

This invention is concerned with a new class of flame retardant polycarbonate compositions which contain a flame retardant additive selected from an alkali or alkaline earth metal salt of an inorganic sulfur compound.

Various observations have been made by the prior art regarding flame retardant additives for polycarbonate compositions including V. Mark's copending disclosures, i.e. U.S. Ser. Nos. 429,120, now U.S. Pat. No. 3,940,366; 429,121, now U.S. Pat. No. 3,948,851; 429,125 still pending, filed Dec. 28, 1973; 429,126, now U.S. Pat. No. 3,978,024; 429,127, now U.S. Pat. No. 3,953,399; 429,128, now U.S. Pat. No. 3,953,396; 429,163, now U.S. Pat. No. 3,909,490; 429,164 still pending, filed Dec. 28, 1973; 429,165, now U.S. Pat. No. 3,917,559; 429,166, now U.S. Pat. No. 3,919,167; 429,642, now U.S. Pat. No. now U.S. Pat. No. 3,926,908; 429,644 still pending, filed Dec. 28, 1973; 429,645, now U.S. Pat. No. 3,931,100; and 429,646, now U.S. Pat. No. 3,951,910 ( all assigned to the assignee of this invention); which describe flame retardant polycarbonate compositions that contain flame retardant additives selected from metal salts of aromatic sulfonic acids, aromatic sulfone sulfonic acids, phenol ester sulfonic acids, halogenated oxocarbon acids, sulfonic acids of aromatic carboxylic acids and esters, aromatic ether sulfonic acids, halogenated methane sulfonic acids, halocycloaliphatic aromatic sulfonic acids, sulfonic acids of aromatic ketones, sulfonic acids of aromatic sulfides, heterocyclic sulfonic acids, halogenated nonaromatic carboxylic acid, aliphatic and olefinic sulfonic acids and aromatic amide sulfonic acids, respectively. Additional flame retardant polycarbonate compositions are described in C. A. Bialous et al. copending disclosures, i.e. U.S. Ser. Nos. 496,115, now U.S. Pat. No. 3,971,756; 496,127, still pending filed Aug. 19, 1974 and 496,128, still pending, filed Aug. 9, 1974; which contain flame retardant additives selected from combinations of Mark's additives and a siloxane, a fibrous glass, or a polyfluoroethylene, respectively, and in V. Mark et al.'s copending disclosure, i.e. U.S. Ser. Nos. 429,643, now U.S. Pat. No. 3,933,734 which contain alkali or alkaline earth metal salts of aromatic sulfonates. All of the above disclosures employ organic salts — either alone or in mixtures thereof, or in combination with other materials — to impart fire-retardance to polycarbonate compositions. All of the above disclosures are assigned to the assignee of this invention.

Unexpectedly, it has been found that alkali and alkaline earth metal inorganic sulfur compounds in admixture with polycarbonate compositions meet the test for flammability of plastic materials described by Underwirters' Laboratories Bulletin No. 94 without deleteriously affecting the physical properties commonly associated with aromatic polycarbonate compositions free of a flame retardant additive.

In essence, my invention comprises a novel flame retardant polycarbonate composition which contains an aromatic polycarbonate and a flame retardant additive selected from an alkali or alkaline earth metal salt of an inorganic sulfite, thiosulfate, dithionite or pyrosulfite, or mixtures thereof. Another embodiment comprises in admixture an aromatic polycarbonate, a member of the aforesaid flame retardant additive class of inorganic sulfur compounds and a glass fiber.

In general, any nonhalogenated aromatic polycarbonate can be employed in my invention, including those derived from aromatic bis-hydroxy compounds, free of halogen substituents, and in particular, e.g. those manufactured from dihydric phenols, such as, e.g. resorcinol, hydroquinone or dihydroxydiphenyl, from bis(hydroxyphenyl)alkanes, such as, e.g. bis(4-hydroxyphenyl)propane-2,2 from trinuclear bisphenols, such as, e.g. α,α'-bis(4-hydroxyphenyl)p-diisopropylbenzene, from bis(hydroxyphenyl)-cycloalkanes, -sulfones, -sulfoxides, -ethers and -sulfides, optionally mixed with glycols, with derivatives of carbonic acid, e.g. its diesters or dihalides, optionally with conjoint use of minor amounts of carboxylic acids or their derivatives which are suitable for the formation of an ester, and which possess an average molecular weight of about 10,000 to 100,000, preferably betwen 20,000 and 50,000.

A presently preferred polycarbonate of a dihydric phenol is represented by the formula

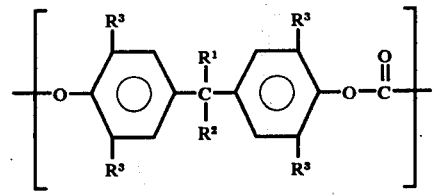

wherein $R^1$ and $R^2$ are hydrogen, $C_{1-4}$ alkyl or phenyl and the $R^3$ groups are selected from hydrogen or $C_{1-4}$ alkyl. It is presently preferred that the number of repeating units be sufficiently high to give a number average molecular weight of about 10,000 and especially a number average molecular weight of from 15,000 to 50,000. Such polymers process easily between about 425° and 480° F. and provide presently preferred mechanical properties.

Especially preferred aromatic polycarbonates are those of the above formula where $R^1$ and $R^2$ are methyl and the $R^3$ groups are each hydrogen. This polymer is available commercially from a number of manufacturers.

Generally useful aromatic polycarbonates have an intrinsic viscosity of at least 0.3 and preferably about 0.6 deciliters per gram (dl./g.) as measured in methylene chloride, or similar solvent systems at 25°–30° C. The upper intrinsic viscosity limit is not critical, however, will generally be about 1.5 dl./g. Especially useful polycarbonate resins generally have an intrinsic viscosity within the range of from about 0.35 to about 0.7 dl./g.

Among the many methods for making the aromatic polycarbonates, which are already incorporated herein in their entirety by reference, are those disclosed in Encyclopedia of Polymer Science and Technology, Vol. 10, entitled "Polycarbonates", pages 710 to 764, published by Interscience Publishers (1969).

Illustratively, generally, the aromatic polycarbonate can be prepared by reacting a dihydric phenol with a carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformate. The acid acceptors, molecular weight regulators and catalyst employed are wellknown in the art and may be any of those commonly used to prepare polycarbonates.

The flame retardant inorganic sulfur additive of my invention can be any alkali or alkaline earth metal salt of the general formulas $M_xSO_3$ (sulfites), e.g. $M_2SO_3$ also commonly represented by the electronic structure

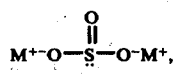

and $M_xS_2O_3$ (thiosulfate), e.g. $M_2S_2O_3$ also commonly represented by the electronic structure

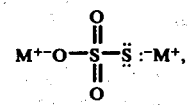

and $M_xS_2O_4$ (dithionites), e.g. $M_2S_2O_4$ also commonly represented by the electronic structure

and $M_xS_2O_5$ (pyrosulfite), e.g. $M_2S_2O_5$ also commonly represented by the electronic structure

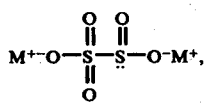

including mixtures thereof,
where M is lithium, sodium, potassium, rubidium, and cesium when $x$ is a number equal to 2, and M is beryllium, magnesium, calcium, strontium, or barium when $x$ is a number equal to 1. The alkali or alkaline earth metal inorganic sulfite, thiosulfate, dithionite or pyrosulfite compounds are wellknown and can be prepared by any of the well-known commercial processes. In all of the above compounds, an unshared pair of electrons is associated with at least one of the sulfur atoms of the compounds.

Alkali or alkaline earth metal inorganic sulfate or dithionate compounds which do not have an unshared pair of electrons associated with a sulfur atom are not effective flame-retardant additives for polycarbonates, and accordingly are not included in the scope of my invention.

Presently preferred inorganic sulfur compounds comprise compounds of the above formulas wherein M is selected from sodium, potassium and calcium and more preferably from sodium and calcium, since these metal salts in combination with polycarbonate resins generally exhibit optimum flame retardant properties. Even more preferred are metal sulfite salts of sodium and calcium. Still even more preferred is sodium sulfite since this salt does not discolor flame retardant polycarbonate compositions. Any amount of an inorganic sulfur compound can be employed subject to the proviso that the amount be at least sufficient to impart flame retardance to the polycarbonate composition, i.e. the polycarbonate and sulfur compound admixture meet the self-extinguishing and nondripping standards of Underwriters' Laboratories Bulletin No. 94. In general — on a weight basis — the inorganic sulfur compound is employed in amounts of from about 0.01 to 10, preferably 0.10 to 2, and more preferably from 0.75 to 1.25 parts per 100 parts of polycarbonate resin.

Any manner of combining the inorganic sulfur compound and the polycarbonate can be employed in accordance with methods which will be obvious to those skilled in the art. Illustratively, a suitable method includes incorporating each ingredient in a premix, passing the premix through an extruder with an extrusion temperature maintained between about 425° and 640° F. The extrudate can be cooled, chopped into pellets, re-extruded, chopped into pellets and molded or extruded into any desired shape.

Another embodiment of the invention comprises glass fiber reinforced flame retardant aromatic polycarbonates of bis-hydroxy compounds. Any amount — on a weight basis 13 of glass fiber can be employed, e.g. 1 to 10, 10 to 50, 50 to 100, or even higher parts of glass fiber per 100 parts of aromatic polycarbonate. Presently preferred flame retardant polycarbonates contain from 5 to 15, and more preferably from 8 to 12 parts of glass fibers per 100 parts of aromatic polycarbonate. In general, the use of less than 15 to 20 parts of glass fibers per 100 parts of aromatic polycarbonate does not decrease the fire-resistance of the polycarbonate compositions of my invention. Generally, however, the addition of 20 to 30 or more parts of glass fiber per 100 of polycarbonate does decrease their fire-resistance. Accordingly, generally, larger amounts — 110% to 150% or even more — than the amount of flame retardant additive used with polycarbonates containing less than 20 parts of glass fiber is required in order to obtain U.L. 94 flammability properties similar to polycarbonates containing greater than 20 parts of glass fiber.

When glass fiber (GF) flame retardant (FR) polycarbonates are employed in the practice of my invention, preferably the glass fibers have average fiber lengths of from 100–600 μ, and more preferably from 200–400 μ. Possible glass fiber materials are all commercially available types of glass fibers, such as, e.g., ground short glass fibers and rovings, but especially staple glass fiber, provided that they possess a fiber finish which is compatible with polycarbonate.

Glass fiber materials, like the flame retardant additive, can be added to the aromatic polycarbonates in various ways, e.g. the fibers can be added to the reaction mixtures before, during or after the manufacture of the polycarbonates, the fibers can be added to polycarbonate solutions or polycarbonate melts, or can be mixed with polycarbonate granules and mixtures thereof, or the fibers can be homogenized by subsequent melt extrusion, etc. In the same manufacturing process, it is possible to add to the polycarbonate in addition to the FR additive and fiber glass, other additives such as, e.g. pigments, nonreinforcing fillers, mold release agents, stabilizers, antioxidants, drip retarding agents, etc.

The following examples illustrate — but do not limit — the best mode of practicing the invention to a person skilled in the art.

Unless otherwise indicated in the examples, the following General Procedures were employed in the preparation and testing of polycarbonate compositions. Any deviations from the General Procedure will be noted in the specific examples.

GENERAL PROCEDURE

A series of aromatic polycarbonate compositions were prepared from commercially available materials comprising (A) the polycarbonate of bisphenol-A, i.e. bis(4-hydroxyphenyl)propane-2,2, Lexan 100, a thermoplastic polycarbonate commercial product of General Electric Company having the following properties: intrinsic viscosity [$\eta$] of 0.55 deciliters per gram (dl./g.) as measured in dioxane at 25° C., and an $M_n$ equal to about 12,300, and a $P_n$ equal to about 48.5 units; and (B) an inorganic sulfite, thiosulfate, dithionite or pyrosulfite compound, by dry blending and precompounding in a hot melt extruder at about 550° F. The extrudate was pelletized. For comparative purposes, compositions containing aromatic polycarbonate free of any flame retardant additive were also prepared in pellet form.

The aromatic polycarbonate and inorganic sulfur compound compositions and control compositions were separately molded into appropriate test shapes, i.e. bars, rods, etc. for flammability testing according to the standards of Underwriters' Laboratories Item 94, (UL 94).

Individual UL 94 test specimens 1/16 inch × ½ inch × 5 inch were vertically clamped and twice exposed for 10 seconds during each exposure to a blue gas flame of 20 mm. height, the top of the gas burner being positioned about 10 mm. from the lower end of the test specimen. The specimens were positioned 12 inches above a horizontal layer of absorbant surgical cotton. For classifying material in a fire class, five test pieces were tested.

The following criteria were employed for classification:

| V-II | Seconds |
|---|---|
| Average Flame Out Time (FOT) | ≤ 25 |
| Maximum After Burning Time (ABT) after any one flame application | 30 |
| The material may drip off burning. | |
| V-I | |
| Average FOT | ≤ 25 |
| Maximum ABT after any one flame application | 30 |
| The material may not drip off burning. | |
| V-O | |
| Average FOT | ≤ 5 |
| Maximum ABT after any one flame application | 10 |
| The material must not drip off burning. | |

Additionally, the polycarbonate compositions were evaluated accordingly: (1) ASTM D256 notched Izod impact strength measured in ft.-lbs./in. employing test bars 2-½ inches long, ½ inches wide and ⅛ inches thick, notched to a depth of 100 mils, having a notched tip radius of 10 mils, and (2) visual determination of color, translucence, transparence, opaqueness, etc.

EXAMPLES 1–7

The Table I data of these examples illustrate that the inorganic sulfur flame retardant aromatic polycarbonate compositions of the invention meet — whereas aromatic polycarbonates containing no flame retardant additives or aromatic polycarbonates containing other inorganic sulfur compounds do not meet — the Underwriters' Laboratories UL 94 test standards. In the examples — on a weight basis — one part of flame retardant additive was combined with 100 parts of aromatic polycarbonate.

TABLE I

| Example No. | Additive | FOT[a] | U.L.94 Rating |
|---|---|---|---|
| 1. | None | 40.0 | Burning |
| 2. | $Na_2SO_4$ | 24.0 | Burning |
| 3. | $Na_2S_2O_6$ | 35.0 | Burning |
| 4. | $Na_2SO_3$ | 5.45 | V-II |
| 5. | $Na_2S_2O_3$ | 5.33 | V-II |
| 6. | $Na_2S_2O_4$ | 4.47 | V-II |
| 7. | $Na_2S_2O_5$ | 5.95 | V-II |

EXAMPLES 8–13

The Table I data of these examples illustrate that the flame retardant additive efficacy varies in accordance with the alkali or alkaline earth metal cation associated with the sulfite, thiosulfate, dithionite or pyrosulfite flame retardant employed in the invention. In the examples — on a weight basis — one part of flame retardant was combined with 100 parts of aromatic polycarbonate.

TABLE I

| Example No. | Additive | FOT[a] | Σ Drip[b] | U.L. 94 Rating |
|---|---|---|---|---|
| 8. | none | 40 | 16 | Burning |
| 9. | $Na_2SO_3$ | 5.45 | 7 | V-II |
| 10. | $K_2SO_3$ | 21.30 | 12 | V-II |
| 11. | $CaSO_3$ | 7.13 | 9 | V-II |
| 12. | $Na_2S_2O_5$ | 5.95 | 13 | V-II |
| 13. | $K_2S_2O_5$ | 12.10 | 8 | V-II |

(a) average flame out time measured in seconds.
(b) total drips

EXAMPLES 14–20

The Table I data of these examples illustrate that the addition of an inorganic sulfur retardant additive to an aromatic polycarbonate does not significantly reduce the notched Izod Impact properties associated with nonglass fiber filled aromatic polycarbonates and that inorganic sulfites in combination with aromatic polycarbonates provide colorless, translucent and nearly transparent flame retardant polycarbonate compositions. In the examples — on a weight basis — one part of flame retardant additive was combined with 100 parts of aromatic polycarbonate.

TABLE I

| Ex. No. | Additive | U.L. 94 Rating | N.I.[a] | Color | Transparency |
|---|---|---|---|---|---|
| 14. | none | Burning | > 12 | Colorless | Transparent |
| 15. | $Na_2SO_4$ | Burning | 8.19 | Colorless | Translucent |
| 16. | $Na_2S_2O_6$ | Burning | n.d.[b] | Colorless | Opaque |
| 17. | $Na_2SO_3$ | V-II | 2.73[c] | Colorless | Translucent |
| 18. | $CaSO_3$ | V-II | 7.21 | n.d. | n.d. |
| 19. | $Na_2S_2O_3$ | V-II | 12.4 | Discolored | Transparent |
| 20. | $K_2S_2O_5$ | V-II | 2.23[c] | Discolored | Translucent |

(a) N.I. = notched Izod.
(b) n.d. = not determined.
(c) K.I. = 5200

EXAMPLE 21

The Table I data of this example illustrates that a glass fiber reinforced flame retardant polycarbonate meets U.L. 94 V-II flammability standards. In the example — on a weight basis — 1.5 parts of flame retardant additive and 9 parts of glass fiber were combined with 100 parts of aromatic polycarbonate.

TABLE I

| Example No. | Additive | FOT | Σ Drip | U.L. 94 Rating |
|---|---|---|---|---|
| 21. | $Na_2SO_3$ | 8.50 | 8 | V-II |

Accordingly, from the foregoing examples, it is seen that aromatic polycarbonate compositions which contain a metal salt of an inorganic sulfur compound — wherein at least one sulfur atom of the compound has an unshared electron pair — are flame retardant compositions.

Other modifications and variations of my invention are possible in light of the above teachings.

I claim:

1. A polycarbonate composition comprising a non-halogenated aromatic polycarbonate and a flame retardant additive selected from an alkali or alkaline earth metal salt of an inorganic sulfite, thiosulfate, dithionite, or pyrosulfite and mixtures thereof.

2. The composition of claim 1, where the additive to polycarbonate weight ratio is within the range of from about 0.1:100 to about 10:100.

3. The composition of claim 1, further comprising a glass fiber.

4. The composition of claim 3, where the glass fiber to polycarbonate weight ratio is within the range of from about 5:100 to about 15:100.

5. The composition of claim 1, where the metal is sodium.

6. The composition of claim 1, where the metal is calcium.

7. The composition of claim 1, where the polycarbonate has an intrinsic viscosity of within the range of from about 0.35 to about 0.7 dl./g. as measured in methylene chloride at 25°–30° C.

8. The composition of claim 7, where the polycarbonate is of the formula

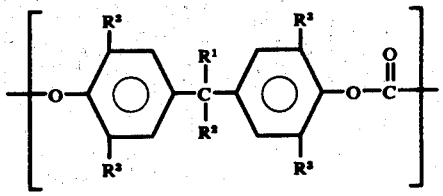

where independently each $R^1$ and $R^2$ is selected from hydrogen, $C_{1-4}$ alkyl and phenyl, and independently each $R^3$ group is selected from hydrogen and $C_{1-4}$ alkyl.

9. The composition of claim 8, where the additive is $Na_2SO_3$.

10. The composition of claim 8, where the additive is $CaSO_3$.